United States Patent
Rahman et al.

(10) Patent No.: US 7,501,981 B2
(45) Date of Patent: Mar. 10, 2009

(54) METHODS AND APPARATUS TO DETECT AND CORRECT INTEGRITY FAILURES IN SATELLITE POSITIONING SYSTEM RECEIVERS

(75) Inventors: Mohammad Atiqur Rahman, Allen, TX (US); Alan Martin Gilkes, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/449,239

(22) Filed: Jun. 8, 2006

(65) Prior Publication Data

US 2007/0115171 A1    May 24, 2007

Related U.S. Application Data

(60) Provisional application No. 60/738,131, filed on Nov. 18, 2005.

(51) Int. Cl.
*G01S 1/00* (2006.01)
*H04B 7/185* (2006.01)

(52) U.S. Cl. ............... 342/357.02; 342/357.03; 342/357.06

(58) Field of Classification Search ................ 342/357.01–357.017
See application file for complete search history.

(56) References Cited

U.S. PATENT DOCUMENTS

| | | | |
|---|---|---|---|
| 5,323,322 A * | 6/1994 | Mueller et al. | 701/215 |
| 5,436,632 A | 7/1995 | Sheynblat | |
| 5,451,964 A * | 9/1995 | Babu | 342/357.06 |
| 5,504,492 A | 4/1996 | Class et al. | |
| 5,583,774 A | 12/1996 | Diesel | |
| 5,600,329 A | 2/1997 | Brenner | |
| 5,610,616 A * | 3/1997 | Vallot et al. | 342/357.03 |
| 5,663,732 A | 9/1997 | Stangeland et al. | |
| 5,666,111 A | 9/1997 | Servat et al. | |
| 5,760,737 A | 6/1998 | Brenner | |
| 5,825,326 A | 10/1998 | Semler et al. | |
| 5,828,332 A | 10/1998 | Frederick | |
| 5,831,576 A | 11/1998 | Sheynblat | |
| 5,841,399 A | 11/1998 | Yu | |
| 5,867,804 A | 2/1999 | Pilley et al. | |
| 5,903,236 A | 5/1999 | Lawrence | |
| 5,910,788 A | 6/1999 | Class | |
| 5,917,445 A | 6/1999 | Schipper et al. | |
| 5,923,286 A | 7/1999 | Divakaruni | |
| 5,926,132 A | 7/1999 | Brenner | |

(Continued)

OTHER PUBLICATIONS

"An Efficient GPS Receiver Algorithm for Channelwise Multipath Detection and Real-Time Positioning", Lee et al., ION NTM 2002, Jan. 28-30, 2002, San Diego, CA, pp. 265-276.

(Continued)

*Primary Examiner*—Thomas H Tarcza
*Assistant Examiner*—Harry Liu
(74) *Attorney, Agent, or Firm*—Ronald O. Neerings; Wade James Brady, III; Frederick J. Telecky, Jr.

(57) ABSTRACT

Methods and apparatus to detect integrity failures in satellite position system (SPS) receivers are disclosed. An example method comprises estimating a position fix from a plurality of pseudoranges, computing a zero-mean error vector based upon the position fix; and determining if an integrity failure has occurred based on the zero-mean error vector.

17 Claims, 3 Drawing Sheets

U.S. PATENT DOCUMENTS

| | | |
|---|---|---|
| 5,931,889 A | 8/1999 | Misra |
| 5,957,995 A | 9/1999 | Beckmann et al. |
| 5,969,668 A | 10/1999 | Young, Jr. |
| 5,969,672 A | 10/1999 | Brenner |
| 5,978,715 A | 11/1999 | Briffe et al. |
| 5,983,161 A | 11/1999 | Lemelson et al. |
| 5,995,040 A | 11/1999 | Issler et al. |
| 5,995,042 A | 11/1999 | Durboraw, III et al. |
| 6,006,158 A | 12/1999 | Pilley et al. |
| 6,023,239 A * | 2/2000 | Kovach ............... 342/357.06 |
| 6,038,498 A | 3/2000 | Briffe et al. |
| 6,091,357 A | 7/2000 | Lazara et al. |
| 6,112,141 A | 8/2000 | Briffe et al. |
| 6,125,325 A * | 9/2000 | Kohli ..................... 701/213 |
| 6,134,484 A | 10/2000 | Geier et al. |
| 6,151,551 A * | 11/2000 | Geier et al. ............... 701/207 |
| 6,163,753 A | 12/2000 | Beckmann et al. |
| 6,166,683 A | 12/2000 | Hwang |
| 6,175,725 B1 | 1/2001 | Auber |
| 6,182,005 B1 | 1/2001 | Pilley et al. |
| 6,195,609 B1 | 2/2001 | Pilley et al. |
| 6,204,806 B1 | 3/2001 | Hoech |
| 6,205,377 B1 | 3/2001 | Lupash et al. |
| 6,216,064 B1 | 4/2001 | Johnson et al. |
| 6,216,065 B1 | 4/2001 | Hall et al. |
| 6,275,773 B1 | 8/2001 | Lemelson et al. |
| 6,281,836 B1 | 8/2001 | Lupash et al. |
| 6,298,316 B1 | 10/2001 | Diesel |
| 6,313,786 B1 | 11/2001 | Sheynblat et al. |
| 6,314,363 B1 | 11/2001 | Pilley et al. |
| 6,317,688 B1 | 11/2001 | Bruckner et al. |
| 6,324,448 B1 | 11/2001 | Johnson |
| 6,373,432 B1 | 4/2002 | Rabinowitz et al. |
| 6,377,892 B1 | 4/2002 | Johnson et al. |
| 6,417,802 B1 | 7/2002 | Diesel |
| 6,430,479 B1 | 8/2002 | Johnson |
| 6,466,846 B2 | 10/2002 | Maynard |
| 6,487,500 B2 | 11/2002 | Lemelson et al. |
| 6,492,945 B2 | 12/2002 | Counselman, III et al. |
| 6,515,618 B1 | 2/2003 | Lupash |
| 6,577,952 B2 * | 6/2003 | Geier et al. ............... 701/214 |
| 6,581,546 B1 | 6/2003 | Dalland et al. |
| 6,584,383 B2 | 6/2003 | Pippenger |
| 6,606,559 B1 | 8/2003 | Beckmann et al. |
| 6,608,589 B1 | 8/2003 | Devereux et al. |
| 6,639,549 B2 | 10/2003 | Vanderwerf et al. |
| 6,646,596 B2 | 11/2003 | Syrjarinne et al. |
| 6,667,713 B2 | 12/2003 | Green et al. |
| 6,691,066 B1 | 2/2004 | Brodie |
| 6,707,422 B2 | 3/2004 | Sheynblat et al. |
| 6,708,090 B2 | 3/2004 | Staggs |
| 6,711,478 B2 | 3/2004 | Hilb |
| 6,717,547 B2 | 4/2004 | Spilker, Jr. et al. |
| 6,728,637 B2 * | 4/2004 | Ford et al. ............... 701/213 |
| 6,757,624 B1 | 6/2004 | Hwang et al. |
| 6,771,214 B2 | 8/2004 | Kober et al. |
| 6,785,594 B1 | 8/2004 | Bateman et al. |
| 6,798,377 B1 | 9/2004 | Lupash et al. |
| 6,847,893 B1 | 1/2005 | Lupash |
| 6,856,905 B2 | 2/2005 | Pasturel et al. |
| 6,859,170 B2 | 2/2005 | Devereux et al. |
| 6,859,173 B2 | 2/2005 | Spilker, Jr. et al. |
| 6,861,984 B2 | 3/2005 | Rabinowitz et al. |
| 6,864,836 B1 | 3/2005 | Hatch et al. |
| 6,901,331 B1 | 5/2005 | Beckmann et al. |
| 6,914,560 B2 | 7/2005 | Spilker, Jr. et al. |
| 6,917,328 B2 | 7/2005 | Rabinowitz et al. |
| 6,985,542 B1 * | 1/2006 | Nir et al. .................... 375/343 |
| 2004/0220733 A1 * | 11/2004 | Pasturel et al. ............... 701/214 |
| 2005/0021284 A1 | 1/2005 | Gaal |
| 2005/0251328 A1 | 11/2005 | Merwe et al. |
| 2005/0264444 A1 * | 12/2005 | Sharpe et al. .......... 342/357.03 |
| 2006/0006309 A1 * | 1/2006 | Dimsdale et al. ......... 250/206.1 |
| 2006/0055596 A1 * | 3/2006 | Bryant et al. .......... 342/357.06 |
| 2007/0156338 A1 * | 7/2007 | Coatantiec et al. .......... 701/214 |

OTHER PUBLICATIONS

"A Baseline RAIM Scheme and a Note on the Equivalence of Three RAIM Methods", Dr. R. Grover Brown, Institute of Navigation National Technical Meeting, Jan. 1992, pp. 127-137.

\* cited by examiner

METHODS AND APPARATUS TO DETECT AND CORRECT INTEGRITY FAILURES IN SATELLITE POSITIONING SYSTEM RECEIVERS

RELATED APPLICATIONS

This patent claims priority from U.S. Provisional Application Ser. No. 60/738,131, entitled "Cumulative zero-mean range residuals to monitor and correct low cost A-GPS receiver position fix integrity failure due to multipath and other error sources" which was filed on Nov. 18, 2005. U.S. Provisional Application Ser. No. 60/738,131 is hereby incorporated by reference in its entirety.

FIELD OF THE DISCLOSURE

This disclosure relates generally to Satellite Positioning System (SPS) receivers, and, more particularly, to apparatus and methods to detect integrity failures in SPS receivers.

BACKGROUND

Generally, satellite positioning systems (SPSs), (e.g., the U.S. Global Positioning System (GPS) and/or the European Galileo System (currently under construction)), provide an invaluable service that has perhaps exceeded the imagination of the designers of the systems. For example, SPS systems are used in military, commercial, medical, scientific, and recreational applications.

When an SPS receiver is determining a position fix, it must be able to acquire and receive signals transmitted from a certain number of SPS satellites before it can determine its position and the current time. For example, in the GPS system, a GPS receiver should be able to receive signals transmitted from at least three or four GPS satellites. Each satellite in an SPS system transmits a unique signal that can be used by an SPS receiver (in conjunction with signals from other SPS satellites) to calculate the SPS receiver's position and the SPS time. One of the most vital pieces of information that can be obtained from the SPS signal is highly accurate timing information. The differences between the timing of the various SPS signals received by the SPS receiver and its own internal clock are then used to calculate the position of the SPS receiver and the current SPS time.

While SPS systems have become widely used today, there remain problems that sometimes hinder their use in certain situations. For example, the satellites are in high-earth orbit and are typically powered by solar panels, the signals that are transmitted by the satellites are usually very weak by the time they reach a SPS receiver (signal strength being inversely proportional to distance). Additionally, SPS signals may be further attenuated by thick foliage, buildings, tunnels, etc. to a point where the SPS signals may fall below a minimum signal power threshold and become difficult or impossible for the SPS receiver to acquire and receive. Moreover, the SPS signals may be reflected and/or obstructed by any of a variety of object(s) such as, for example, a building. An SPS receiver may receive such reflected SPS signals instead of, or in addition to, direct line-of-sight SPS signals. Such reflected SPS signals are commonly referred to in the industry as multipath SPS signals and frequently occur in so called "urban canyons." Weak SPS signals, attenuated SPS signals and/or multipath SPS signals may cause an SPS receiver to incorrectly and/or inaccurately determine its location.

DETAILED DESCRIPTION

Figures 1, 3:
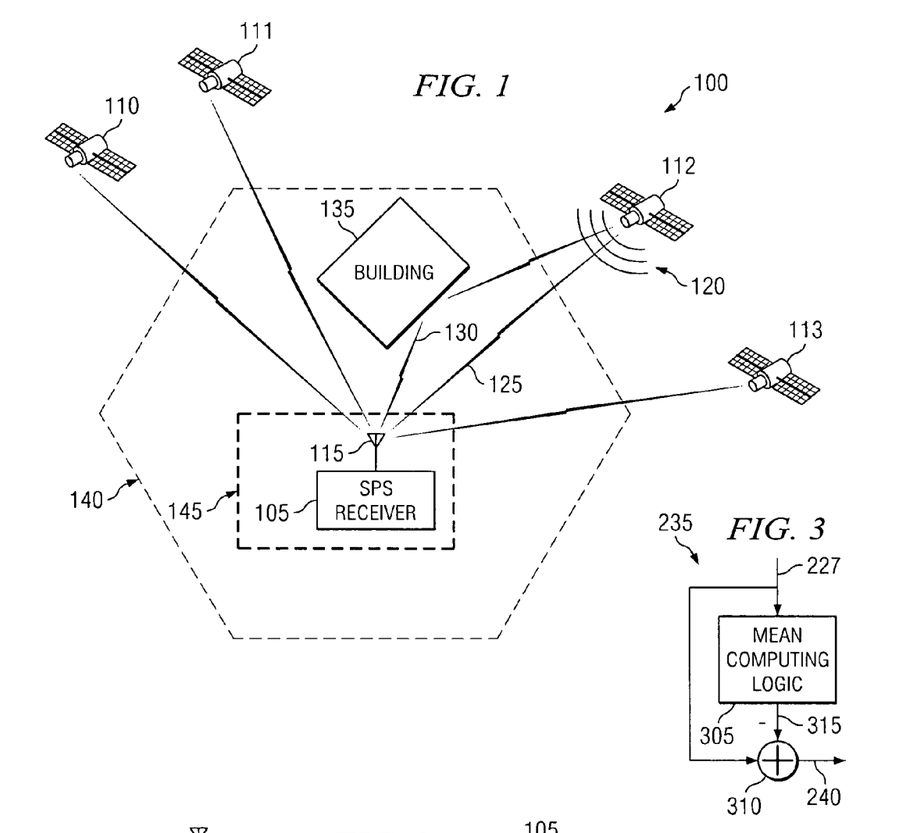
FIG. 1 is a diagram of an example satellite positioning system (SPS) with a plurality of SPS satellites and an SPS receiver constructed in accordance with the teachings of the invention.
FIG. 3 illustrates an example manner of the implementing the example error vector cleanup logic of FIG. 2.

FIG. 1 illustrates an example satellite positioning system (SPS) 100 with an SPS receiver 105 and a plurality of SPS satellites (four of which are shown with reference numerals 110, 111, 112 and 113) from which the example SPS receiver 105 is capable of receiving transmitted signals. In an SPS system, (e.g., the Global Positioning System (GPS)), the example SPS receiver 105 of FIG. 1 attempts to receive a unique signal from each of several satellites (at least three or four) via any variety of antenna 115. From this set of signals, the example SPS receiver 105 is capable of estimating its location (i.e., determining a position fix) and/or deriving an accurate SPS time.

While four SPS satellites 110-113 are illustrated in FIG. 1, the example SPS 100 may include any number of SPS satellites. Moreover, while reception and/or acquisition of a requisite number of SPS signals is required to determine a position fix, the example SPS receiver 105 preferably receives and/or acquires SPS signals from a larger number of SPS satellites such that, as described below, the SPS receiver 105 may detect and/or correct for one or more invalid, degraded and/or inaccurate pseudoranges. For example, if the example SPS receiver 105 utilizes 3 pseudoranges to perform a 2-dimensional position fix, then the estimation of 4 pseudoranges allows the SPS receiver 105 to eliminate an invalid, degraded and/or inaccurate pseudorange and still perform a 2-dimensional position fix.

As illustrated in FIG. 1, due to operation in an environment that is attenuating, obstructing, interfering and/or reflecting the transmitted signals of the SPS satellites 110, 111, 112 and/or 113, the example SPS receiver 105 may not be able to acquire and/or may not be able to accurately acquire the requisite number of direct-line-of-sight SPS satellite signals. For example, signal attenuation and/or signal reflection(s) may be the result of the SPS receiver 105 being operated under thick foliage, inside of a building such as a parking structure, inside a car that is inside a tunnel, in an urban canyon, near a building, etc. For example, a signal 120 transmitted by the SPS satellite 112 may arrive at the SPS receiver 105 via a direct line-of-sight propagation path 125 and/or indirectly as a reflected signal 130 created by reflection of the signal 120 by, for example, a building 135. Regardless of the cause(s) of the signal attenuation (s), obstruction(s), interference(s) and/or reflection(s), the phenomena causing the attenuation (s), obstruction(s), interference(s) and/or reflection(s) are schematically represented in FIG. 1 as a bubble 140.

The signal(s) transmitted from each SPS satellite are uniquely encoded so that the example SPS receiver 105 of FIG. 1 can determine the identity of the source SPS satellite from the corresponding received signal. In the GPS system, for example, each GPS satellite transmits a signal including a satellite identifier and a timing reference. A GPS receiver can detect and use the satellite identifier and the timing reference to determine a timing offset between itself and the GPS satellite that transmitted the signal. Generally, this timing offset, when used in conjunction with at least two additional timing offsets (determined from received signals from other GPS satellites), permits the GPS receiver to accurately resolve its position (including longitude, latitude, and altitude) and/or the SPS time.

For an SPS receiver (e.g., the example SPS receiver 105) to perform a position fix, it must acquire a requisite number of transmitted signals from different SPS satellites to resolve the SPS receiver's position and the SPS time. The acquisition process requires that the example SPS receiver 105 correlate signals it is receiving with a locally generated copy of a particular signal (composed from a satellite identifier code and a local timing reference) for which the SPS receiver is searching. Correlation involves the multiplication of the locally generated copy with received signals. A match occurs when, for example, the result of the multiplication exceeds a predetermined threshold. In the example system 100 of FIG. 1, the correlating of signals may be done by the example SPS receiver 105 using any variety of method(s), technique(s) and/or algorithm(s). To speed up and/or improve the correlation process any of a variety of method(s), technique(s) and/or algorithm(s) may be used to improve and/or increase the accuracy of a local clock used by the example SPS receiver 105 of FIG. 1. Example methods and apparatus to improve the accuracy of an SPS receiver's local clock is described in U.S. patent application Ser. No. 11/112,018, which is hereby incorporated by reference in its entirety.

Using any of a variety of method(s), technique(s) and/or algorithm(s), the example SPS receiver 105 of FIG. 1 uses an output of the correlation process that represents the time required for a particular signal to propagate from a particular satellite to the SPS receiver 105 to determine an estimate of the distance from the example SPS receiver 105 to that particular satellite. Such an estimated distance is commonly referred to in the industry as a "pseudorange" since the SPS receiver's local clock, with its inherent inaccuracies and/or offsets, is used to determine the distance (i.e., the range) from the SPS receiver 105 to the particular satellite and, thus, can only represent an estimate of the range.

As discussed previously, the signals received by the example SPS receiver 105 may be weak and/or may be affected due to obstruction(s) and/or multipath reception and/or interference effects. For example, these effects cause the transmitted satellite signal received at the SPS receiver 105 to exhibit a time delay relative to an unobstructed signal passing directly from the satellite to the SPS receiver 105. Thus, a pseudorange determined from a time delayed/multipath signal 130 may be different than a presumably more accurate pseudorange computed from the example direct line-of-sight signal 125. If both the multipath signal 130 and the line-of-sight signal 125 are received interference may occur and, thus, a subsequent pseudorange computed for the satellite 112 will be correspondingly affected. For all of the reasons discussed above, time delays and/or pseudoranges determined by the example SPS receiver 105 of FIG. 1 may be invalid, degraded and/or inaccurate. To improve the accuracy of position fixes determined by the example SPS receiver 105, the example SPS receiver 105 of FIG. 1 attempts to detect when one or more pseudoranges are invalid, degraded and/or inaccurate.

In the illustrated example of FIG. 1, the example SPS receiver 105 and the example antenna 115 may be associated with, communicatively coupled to, and/or implemented by and/or within any variety of device 145. Example devices 145 include a hand-held and/or mobile GPS navigator, a laptop, a cellular phone, a satellite phone, a personal digital assistant (PDA), an automobile, a train, a plane, survey equipment, construction equipment, emergency equipment, a rocket, etc.

Figure 2:
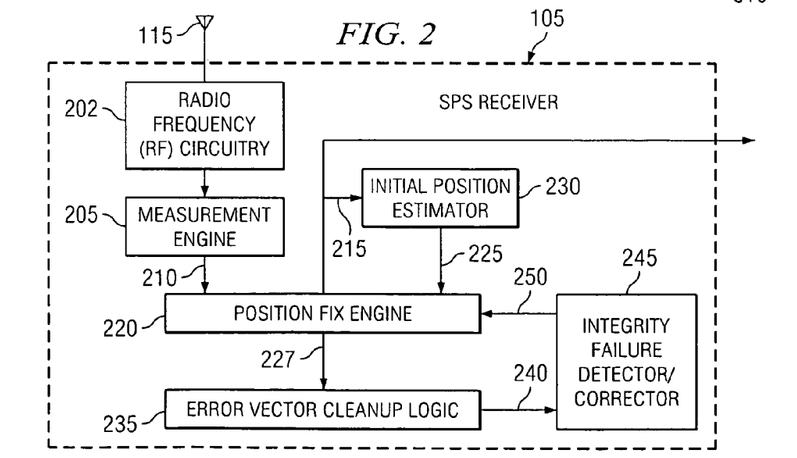
FIG. 2 illustrates an example manner of implementing the example SPS receiver of FIG. 1 constructed in accordance with the teachings of the invention.

FIG. 2 illustrates an example manner of implementing at least a portion of the example SPS receiver 105 of FIG. 1. To process and/or convert an analog SPS signal received via the example antenna 115 into a digital signal, the example SPS receiver 105 of FIG. 2 includes radio frequency (RF) circuitry 202. The RF circuitry 202 may implement, for example, frequency conversion(s), gain(s), filtering, analog-to-digital conversion, etc.

To determine pseudoranges from SPS signals received from any number of SPS satellites, the example SPS receiver 105 of FIG. 2 includes any variety of measurement engine 205. Using any of a variety of method(s), technique(s) and/or algorithm(s), the example measurement engine 205 of FIG. 2 receives SPS signals from SPS satellites via the antenna 115 and the RF circuitry 202 and determines pseudoranges 210 to the SPS satellites based on the received SPS signals.

To estimate a current position 215 of the SPS receiver 105 based on the psuedoranges 210, the example SPS receiver 105 of FIG. 2 includes a position fix engine 220. Using any of a variety of method(s), technique(s) and/or algorithm(s), the example position fix engine 220 of FIG. 2 iterates a current estimated position based on the pseudoranges 210 provided by the example measurement engine 205 and, in the example of FIG. 2, a starting position estimate 225. While the example position fix engine 220 of FIG. 2 preferably utilizes a starting position estimate 225, persons of ordinary skill in the art will appreciate that the starting position estimate 225 can be eliminated, but such elimination may increase the time required to achieve a position fix, affect the accuracy of a resultant position fix, and/or affect the detection and/or correction of integrity failures.

The example position fix engine 220 of FIG. 2 iterates an estimated position to minimize a difference between the pseudoranges 210 and range values calculated based on the current estimated position. Using, for example, least-squares (LS) or weighted LS (WLS) adaptation method(s), technique(s) and/or algorithm(s), the example position fix engine 220 of FIG. 2 iterates on the mathematical expression shown in EQN (1) until, for example, adjustments to a state vector are small enough (e.g., less than a pre-determined threshold) such that a position fix is declared.

$$Y = GX + \epsilon \qquad \text{EQN (1)}$$

where X is a state vector that defines the current estimated position and clock bias adjustments, G is a Geometry and/or Observation matrix that represents the orbital locations of the SPS satellites, Y is a vector that represents the current difference between the measured pseudoranges 210 and the current estimated ranges based upon the current estimated position, and $\epsilon$ is a vector that represents measurement errors 227 for the current iteration. In the illustrated example, the starting position estimate 225 is used in the formation of an initial state vector X prior to the start of the iterations. Once the iterations are completed, the example position fix engine 220 outputs the current estimated position represented in the current state vector X as a position fix 215.

To determine and/or otherwise compute the starting position estimate 225, the example SPS receiver 105 of FIG. 2 includes an initial position estimator 230. The example initial position estimator 230 of FIG. 2 estimates the current position of the SPS receiver 105 using previous position fixes 215 determined by the position fix engine 220. For example, if the example SPS receiver 105 is substantially stationary, the initial position estimator 230 uses a weighted and/or unweighted average of previous position fixes 215 to compute the starting position estimate 225. If the example SPS receiver 105 is moving, then using any of a variety of method(s), technique (s) and/or algorithm(s), the initial position estimator 230 may, additionally or alternatively, utilize an estimated velocity and at least one previous position fix 215 to calculate the starting position estimate 225. For example, the SPS initial position estimator 230 may utilize, for example, a Doppler shift or previous position fixes 215 to estimate the velocity of the SPS receiver 105. In the illustrated example of FIG. 2, the initial position estimator 230 provides a starting position estimate 225 to the position fix engine 220 for use in determining each position fix 215. Alternatively, based upon any variety of criteria, the initial position estimator 230 may only provide a starting position estimate 225 if certain operating conditions are satisfied. For example, if the motion of the SPS receiver 105 is too fast and/or erratic, a starting position estimate 225 may not be provided by the initial position estimator 230.

Due to any of a variety of reasons and/or due to a cost saving design decision for the SPS receiver 105, the pseudorange measurement errors E 227 for a given iteration of the position fix engine 220 are not necessarily uncorrelated, independent, zero-mean and/or normally distributed and/or may contain common mode components. The use of such measurement errors $\epsilon$ 227 for integrity failure detection may result in false detection of integrity failure(s) and/or an incorrect determination that the pseudoranges 210 are valid and/or sufficiently accurate (as defined against a pre-determined threshold). To substantially improve the accuracy of integrity failure detection, the example SPS receiver 105 includes error vector cleanup logic 235. For each iteration of the position fix engine 220, the example error vector cleanup logic 235 of FIG. 2 computes a zero-mean error vector $\epsilon'$ 240 based on a measurement error vector $\epsilon$ 227 provided by the example position fix engine 220. An example manner of implementing the example error vector cleanup logic 235 of FIG. 2 is discussed below in connection with FIG. 3.

Due to any of a variety of condition(s), interference(s), etc, one or more of the pseudoranges 210 may be invalid, degraded and/or inaccurate and, thus, cause the position fix engine 220 to incorrectly and/or inaccurately estimate a position fix 215. To detect such invalid, degraded and/or inaccurate pseudoranges, the example SPS receiver 105 of FIG. 2 includes an integrity failure detector/corrector 245. The example integrity failure detector/corrector 245 of FIG. 2 computes an integrity failure detection statistic based on the zero-mean error vectors $\epsilon'_j$ 240 and then uses the integrity failure detection statistic to detect an integrity failure. When an integrity failure is detected, the example integrity failure detector/corrector 245 provides an identifier number of the satellite whose pseudorange is rejected as an indication that an integrity failure was detected. When no integrity failure is detected, the example integrity failure detector/corrector 245 provides a "null" signal value. An example manner of implementing the example integrity failure detector/corrector 245 is discussed below in connection with FIG. 4.

Figures 4, 5:
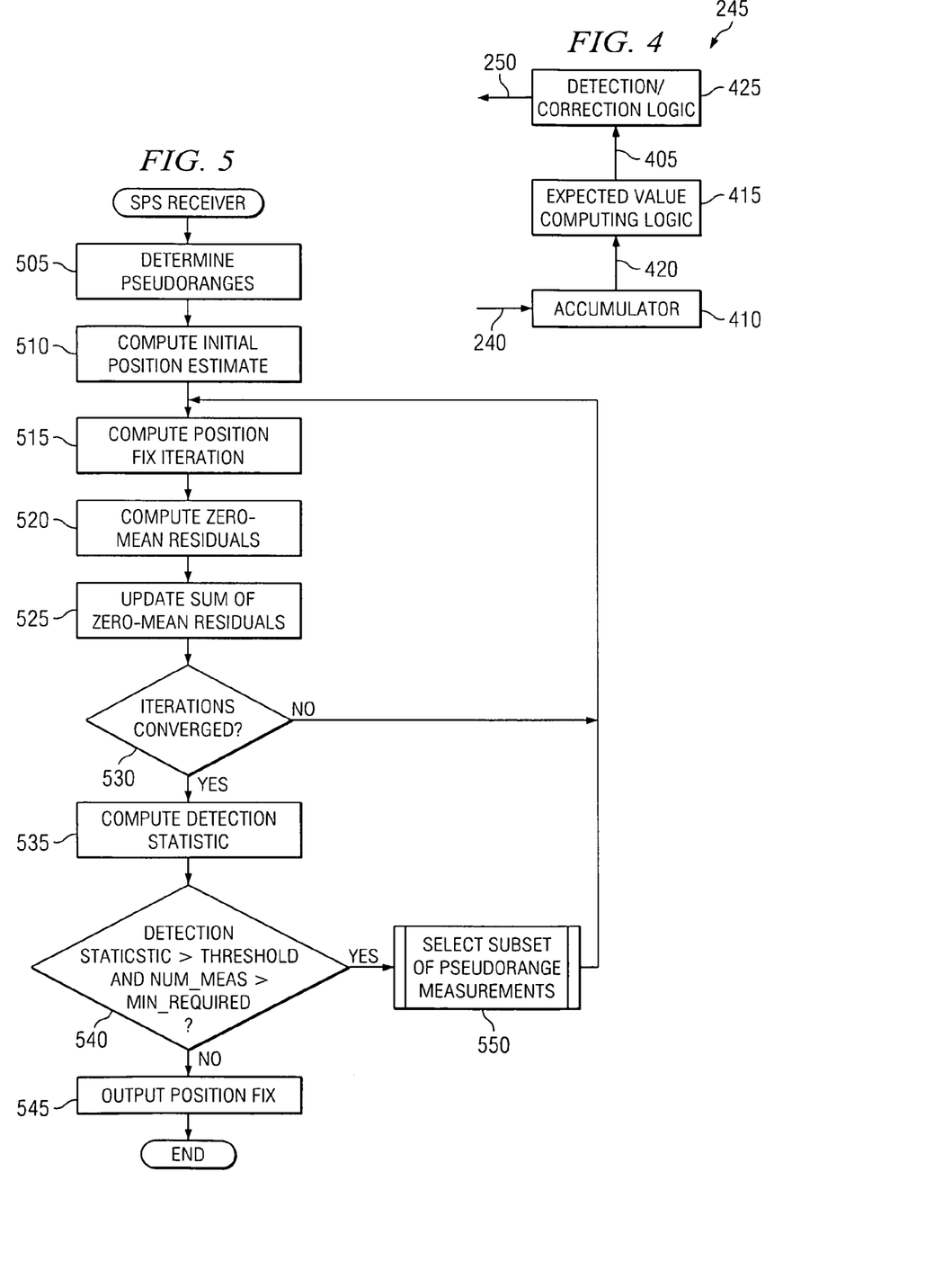
FIG. 4 illustrates an example manner of the implementing the example integrity failure detector/corrector of FIG. 2.
FIGS. 5 and 6 are flowcharts representative of example machine accessible instructions that may be executed to implement the example SPS receiver of FIG. 2.

In response to an integrity failure indication 250 that identifies a rejected pseudorange, the example position fix engine 220 of FIG. 2 re-attempts to determine a position fix after eliminating that pseudorange from its calculations. This process continues until, for example, a valid position fix is determined (i.e., without a detected integrity failure), no more pseudoranges can be eliminated, or the time allotted to perform the position fix expires. In the illustrated example, the position fix engine 220 outputs the position fix 215 when the iterations have converged and/or ended, and no integrity failure has been detected. Other output criteria may, additionally or alternatively, be used. In the example of FIG. 2, when the position fix engine 220 re-attempts to determine a position fix after eliminating a pseudorange, the state of the example integrity failure detector/corrector 245 is reset (e.g., the value of an accumulator 410 of FIG. 4 is set to zero).

While an example SPS receiver 105 has been illustrated in FIG. 2, the elements, modules, logic, memory and/or devices illustrated in FIG. 2 may be combined, re-arranged, eliminated and/or implemented in any of a variety of ways. Further, the example measurement engine 205, the example position fix engine 220, the example initial position estimator 230, the example error vector cleanup logic 235, the example integrity failure detector/corrector 245 and/or, more generally, the example SPS receiver 105 of FIG. 2 may be implemented by hardware, software, firmware and/or any combination of hardware, software and/or firmware. For example, the example measurement engine 205, the example position fix engine 220, the example initial position estimator 230, the example error vector cleanup logic 235 and/or the example integrity failure detector/corrector 245 may be implemented via machine accessible instructions executed by any variety of processor 105 such as, for example, a processor from the TI® family of digital signal processors (DSPs), processors and/or microcontrollers. Moreover, an SPS receiver may include additional elements, modules, logic, memory and/or devices than those shown in FIG. 2 and/or may include more than one of any of the illustrated elements, modules and/or devices.

FIG. 3 illustrates an example manner of implementing the example error vector cleanup logic 235 of FIG. 2. To compute the zero-mean error vector 240, the example error vector cleanup logic 235 of FIG. 3 includes mean computing logic 305 and a summer 310. The example mean computing logic 235 of FIG. 2 computes a mean $\bar{\epsilon}$ 315 of the elements of each measurement error vector $\epsilon$ 227. In particular, the example mean computing logic 305 computes the mean $\bar{\epsilon}_j$ 315 for the $j^{th}$ iteration of the position fix engine 220 as shown in the following mathematical expression:

$$\bar{\epsilon}_j = \frac{\epsilon_j^1 + \epsilon_j^2 + \Lambda + \epsilon_j^m}{m}, \qquad \text{EQN (2)}$$

where m is the number of elements in the measurement error vector $\epsilon_j$ 227 for the $j^{th}$ iteration. The example summer 310 of FIG. 3 subtracts the mean $\bar{\epsilon}_j$ 315 from each element of the $j^{th}$ measurement error vector $\epsilon_j$ 227 to compute a zero-mean error vector $\epsilon'_j$ 240. In particular, the example summer 310 implements the following mathematical expression:

$$\epsilon'_j = \epsilon_j - \bar{\epsilon}_j. \qquad \text{EQN (3)}$$

In the example of FIGS. 2 and/or 3, the example error vector cleanup logic 235 computes a zero-mean error vector $\epsilon'_j$ 240 for each iteration of the position fix engine 220.

While example error vector cleanup logic 235 has been illustrated in FIG. 3, the elements, modules, logic, memory and/or devices illustrated in FIG. 3 may be combined, re-arranged, eliminated and/or implemented in any of a variety of ways. Further, the example mean computing logic 305, the example summer 310 and/or, more generally, the example error vector cleanup logic 235 of FIG. 3 may be implemented by hardware, software, firmware and/or any combination of hardware, software and/or firmware. For example, the example mean computing logic 305 and/or the example summer 310 may be implemented via machine accessible instructions executed by any variety of processor such as, for example, a processor from the TI® family of digital signal processors (DSPs), processors and/or microcontrollers. Moreover, error vector cleanup logic may include additional elements, modules, logic, memory and/or devices than those shown in FIG. 3 and/or may include more than one of any of the illustrated elements, modules and/or devices.

FIG. 4 illustrates an example manner of implementing the example integrity failure detector/corrector 245 of FIG. 2. To compute an integrity failure detection statistic 405, the example integrity failure detector/corrector 245 of FIG. 4 includes an accumulator 410 and expected value computing logic 415. The example accumulator 410 of FIG. 4 performs a vector summation of the zero-mean error vectors $\epsilon'_j$ 240 to compute a sum $\epsilon'_{sum}$ 420. In particular, the example accumulator 410 of FIG. 2 computes the $\epsilon'_{sum,j}$ 420 for the $j^{th}$ iteration of the position fix engine 220 as shown in the following mathematical expression:

$$\epsilon'_{sum,j} = \epsilon'_{sum,j-1} + \epsilon'_j, \qquad \text{EQN (4)}$$

where $\epsilon'_{sum,j-1}$ is the sum 420 from the previous (i.e., $j-1^{th}$) iteration and the +operator signifies vector addition. The number of vectors summed together by the example accumulator 410 depends upon the number of iterations (e.g., 1, 2, 3, 4, ..., n) performed by the example position fix engine 220. The example expected value computing logic 415 of FIG. 4 computes the integrity failure detection statistic 405 as an expected value and/or magnitude (e.g., the sum squared error (SSE)) of the sum vector $\epsilon'_{sum,j}$ 405. In particular, the example expected value computing logic 415 of FIG. 4 computes the SSE 405 as shown in the following mathematical expression:

$$SSE = (\epsilon'_{sum,j})^T \epsilon'_{sum,j}, \qquad \text{EQN (5)}$$

where T is the vector transpose operator.

To detect an integrity failure based on the integrity failure detection statistic 405 computed by the expected value computing logic 415, the example integrity failure detector/corrector 245 of FIG. 4 includes detection/correction logic 425. The example detection/correction logic 425 of FIG. 4 compares the example SSE 405 of EQN (5) (i.e., the detection statistic 405) with a pre-determined threshold. If the SSE 405 does not exceed the threshold, no integrity failure is detected and a "null" signal is provided to the position fix engine 220. In response to the "null" signal, the example position fix engine 220 outputs the position fix 215.

If the SSE 405 exceeds the threshold, an integrity failure is detected and the example integrity failure detector/corrector 245 re-applies the expected value computing logic 415 to calculate a detection statistic 405 for different subsets of the pseudoranges 210. In particular, the example expected value computing logic 415 of FIG. 4 sequentially removes one element from the sum vector 420 (i.e., a subset) and calculates an SSE 405 that would have resulted if the corresponding pseudorange had not been utilized by the position fix engine 220. In this way, the example expected value computing logic 415 computes a set of SSE 405 values that correspond to each element of the sum vector 420 and, thus, to one of the SPS satellites. The satellite identifier number corresponding to the smallest SSE 405 value (i.e., the pseudorange causing the integrity failure) is provided to the position fix engine 220. The state of the accumulator 410 is then reset and accumulation of zero-mean error vectors 240 is restarted. Since one pseudorange has been signaled to the position fix engine 220 by the integrity failure detector/corrector 245, there will be one fewer elements in the error vectors 227, the zero-mean error vectors 240, and the sum vector 420.

While an example integrity failure detector/corrector 245 has been illustrated in FIG. 4, the elements, modules, logic, memory and/or devices illustrated in FIG. 4 may be combined, re-arranged, eliminated and/or implemented in any of a variety of ways. Further, the example accumulator 410, the example expected value computing logic 415, the example detection/correction logic 425 and/or, more generally, the example integrity failure detector/corrector 245 of FIG. 4 may be implemented by hardware, software, firmware and/or any combination of hardware, software and/or firmware. For example, the example accumulator 410, the example expected value computing logic 415 and/or the example detection/correction logic 425 may be implemented via machine accessible instructions executed by any variety of processor such as, for example, a processor from the TI® family of digital signal processors (DSPs), processors and/or microcontrollers. Moreover, an integrity failure detector may include additional elements, modules, logic, memory and/or devices than those shown in FIG. 4 and/or may include more than one of any of the illustrated elements, modules and/or devices.

Figure 6:
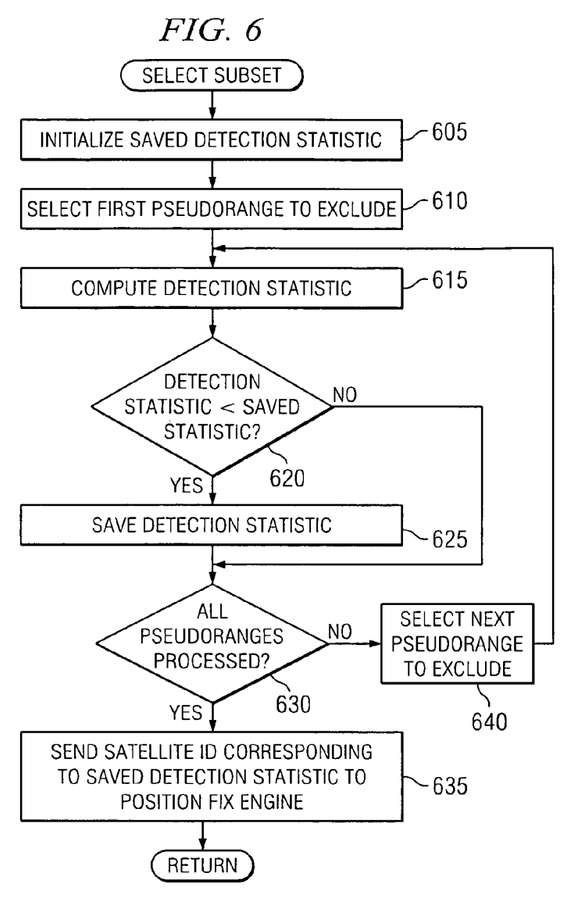

FIGS. 5 and 6 are flowcharts representative of example machine accessible instructions that may be executed to implement the example SPS receiver 105 of FIG. 2. The example machine accessible instructions of FIGS. 5 and/or 6 may be executed by a DSP, processor, a core, a controller and/or any other suitable processing device. For example, the example machine accessible instructions of FIGS. 5 and/or 6 may be embodied in coded instructions stored on a tangible medium such as a flash memory, or random access memory (RAM) associated with a processor (e.g., the processor 705 shown in the example processor platform 700 and discussed below in conjunction with FIG. 7). Alternatively, some or all of the example flowcharts of FIGS. 5 and/or 6 may be implemented using an application specific integrated circuit (ASIC), a programmable logic device (PLD), a field programmable logic device (FPLD), discrete logic, hardware, firmware, etc. Also, some or all of the example flowcharts of FIGS. 5 and/or 6 may be implemented manually or as combination(s) of any of the foregoing techniques, for example, a combination of firmware, software and/or hardware. Further, although the example machine accessible instructions of FIGS. 5 and 6 are described with reference to the flowcharts of FIGS. 5 and 6, persons of ordinary skill in the art will readily appreciate that many other methods of implementing the example SPS receiver 105 of FIG. 2 may be employed. For example, the order of execution of the blocks may be changed, and/or some of the blocks described may be changed, eliminated, sub-divided, or combined. Additionally, persons of ordinary skill in the art will appreciate that the example machine accessible instructions of FIGS. 5 and/or 6 may be carried out sequentially and/or carried out in parallel by, for example, separate processing threads, processors, devices, circuits, etc. Moreover, the machine accessible instructions of FIGS. 5 and/or 6 may be carried out, for example, serially and/or in parallel with any other variety of machine accessible instructions, processes and/or operations.

The example machine accessible instructions of FIG. 5 begin with the example SPS receiver 105 of FIG. 2 (e.g., the example measurement engine 205 of FIG. 2) receiving SPS signals and determine pseudoranges (block 505). The SPS receiver 105 (e.g., the initial position estimator 230 of FIG. 2) then computes a starting position estimate 225 based upon previous position fixes 215 (block 510).

The SPS receiver 105 (e.g., the example position fix engine 220 of FIG. 2) performs the first iteration of any of a variety of position fix technique(s), method(s) and/or algorithm(s) (block 515). The SPS receiver 105 (e.g., the example error vector cleanup logic 235 of FIG. 2) computes a zero-mean measurement error vector 240 using, for example, the mathematical expressions illustrated in EQN (2) and EQN (3) noted above (block 520). The SPS receiver (e.g., the example accumulator 410 of FIG. 4) then updates the vector sum 420 of the zero-mean error vectors 240 using, for example, the mathematical expression of EQN (4) (block 525).

If the position fix engine 220 determines that the iterations have converged (block 530), the SPS receiver 105 (e.g., the example expected value computing logic 415 of FIG. 4) computes the SSE 405 (i.e., expected value) of the vector sum 420 computed by, for example, the accumulator 410 (block 535).

If the expected value is less than a threshold or there are no more than the minimum number of pseudoranges required to perform a position fix available (block 540), the SPS receiver 105 (e.g., the example position fix engine 220 of FIG. 2) outputs the determined position fix (block 545). Control then exits from the example machine accessible instructions of FIG. 5.

If the expected value (i.e., decision statistic) is greater than or equal to the threshold and there are more than the minimum number of pseudoranges required to perform a position fix still available (block 540), then using, for example, the example machine accessible instructions illustrated in FIG. 6, the example detection/correction logic 425 determines the pseudorange causing the integrity failure and signals the same to the position fix engine 220 (block 550). Control then returns to block 515 to restart position fix iterations from the starting position estimate.

Returning to block 530, if iterations have not converged (block 530), control returns to block 515 to perform the next iteration.

The example machine accessible instructions of FIG. 6 begin when the example SPS receiver 105 of FIG. 2 (e.g., the example detection/correction logic 425) detects an integrity failure (e.g., at block 550 of FIG. 5). The example SPS receiver 105 initializes the value of a saved detection statistic to, for example, a substantially large value (block 605). The example detection/correction logic 425 selects a first pseudorange (e.g., corresponding to the first element of the sum error vector 405) (block 610) and then the expected value computing logic 415 computes a detection statistic after the element is eliminated from the error vector 405 (block 615).

If the computed detection statistic (block 615) is less than the saved detection statistic (block 620), the example detection/correction logic 425 replaces the saved detection statistic with the computed detection statistic (block 625). If the computed detection statistic (block 615) is greater than or equal to the saved detection statistic (block 620), the example detection/correction logic 425 skips replacing the saved detection statistic.

If all of the pseudoranges have been processed (i.e., each element of the summed error vector 405 have sequentially been removed) (block 630), the example detection/correction logic 425 sends the satellite identifier number corresponding to the saved detection statistic go the position fix engine 220 (block 635). Control then returns from the example machine accessible instructions of FIG. 6 to, for example, the example machine accessible instructions of FIG. 5.

If not all of the pseudoranges have been processed (block 630), the example detection/correction logic 425 selects the next pseudorange (block 640). Control then returns to block 615 to compute the corresponding detection statistic.

Figure 7:
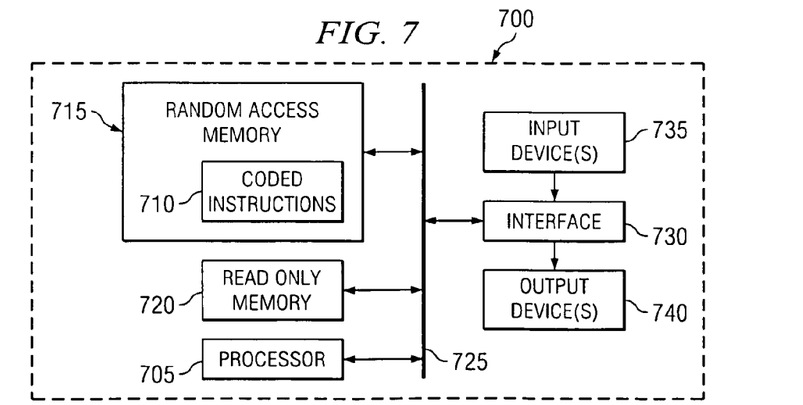
FIG. 7 is a schematic illustration of an example processor platform that may be used and/or programmed to execute the example machine accessible instructions illustrated in FIGS. 5 and/or 6 to implement the example SPS receiver of FIG. 2.

FIG. 7 is a schematic diagram of an example processor platform 700 that may be used and/or programmed to implement the example measurement engine 205, the example position fix engine 220, the example initial position estimator 230, the example error vector cleanup logic 235, the example mean computing logic 305, the example summer 310, the example integrity failure detector/corrector 245, the example accumulator 410, the example expected value computing logic 415, the example detection/correction logic 425 and/or, more generally, the example SPS receiver 105 of FIG. 2. For example, the processor platform 700 can be implemented by one or more general purpose processors, cores, microcontrollers, etc.

The processor platform 700 of the example of FIG. 7 includes a general purpose programmable processor 705. The processor 705 executes coded instructions 710 present in main memory of the processor 705 (e.g., within a RAM 715). The processor 705 may be any type of processing unit, such as a processor from the TI® family of DSPs, cores, processors and/or microcontrollers. The processor 705 may execute, among other things, the example machine accessible instructions of FIGS. 5 and/or 6 to implement the SPS receiver 105 of FIG. 2.

The processor 705 is in communication with the main memory (including a read only memory (ROM) 720 and the RAM 715) via a bus 725. The RAM 715 may be implemented by dynamic random access memory (DRAM), Synchronous DRAM (SDRAM), and/or any other type of RAM device, and ROM may be implemented by flash memory and/or any other desired type of memory device. Access to the memory 715 and 720 maybe controlled by a memory controller (not shown). The RAM 715 may be used to store, for example, the pseudoranges 210 or a plurality of position fixes 215 of FIG. 2.

The processor platform 700 also includes an interface circuit 730. The interface circuit 730 may be implemented by any type of interface standard, such as an external memory interface, serial port, general purpose input/output, etc.

One or more input devices 735 and one or more output devices 740 are connected to the interface circuit 730. The input devices 735 may be used to, for example, receive SPS signals from the antenna 115 and/or provide position fixes 215 to a device 145 (FIG. 1).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
   measuring a plurality of pseudoranges using an antenna;
   performing a first position fix iteration using the plurality of measured pseudoranges to form a first measurement error vector;

performing a second position fix iteration using the plurality of measured pseudoranges to form a second measurement error vector;
computing a first mean of the first measurement error vector;
subtracting the first mean from the first measurement error vector to form a first zero-mean error vector;
computing a second mean of the second measurement error vector;
subtracting the second mean from the second measurement error vector to form a second zero-mean error vector;
computing a sum vector of the first and the second zero-mean error vectors; and
determining whether an integrity failure has occurred based on the sum vector.

2. A method as defined in claim 1, further comprising;
computing a magnitude of the sum vector; and
comparing the magnitude to a threshold to determine whether the integrity failure has occurred.

3. A method as defined in claim 1, further comprising:
determining a starting position estimate based upon the second position fix iteration;
measuring a second plurality of pseudoranges using the antenna; and
estimating a first position fix from the second plurality of measured pseudoranges and the starting position estimate.

4. A method as defined in claim 3, wherein the second position fix iteration results in a second position fix, and determining the starting position estimate comprises computing an average of the second position fix and at least one previous position fix.

5. A method as defined in claim 4, wherein the average is at least one of a weighted average or an unweighted average.

6. A method as defined in claim 3, wherein the second position fix iteration results in a second position fix, and determining the starting position estimate comprises:
computing a velocity based on the second position fix and at least one previous position fix; and
computing the starting position estimate based on the computed velocity and the position fix.

7. A method as defined in claim 1, wherein measuring the plurality of pseudoranges using the antenna comprises:
using the antenna to receive a plurality of times from respective ones of a plurality of satellites; and
calculating the pseudoranges from the plurality of received times based upon orbital locations of the plurality of satellites.

8. A method as defined in claim 1, wherein the plurality of measured pseudoranges include at least one of a correlated error or a common mode error.

9. An apparatus comprising:
an antenna to receive a plurality of times from respective ones of a plurality of satellites;
a measurement engine to calculate a plurality of pseudoranges based on the received plurality of times;
a position fix engine to estimate a position fix using the plurality of measured pseudoranges, and to compute a measurement error vector based on the position fix;
computing logic to compute a mean of the measurement error vector;
a summer to subtract the mean from the measurement error vector to form a zero-mean error vector; and
an integrity failure detector to detect an integrity failure based on the zero-mean error vector.

10. An apparatus as defined in claim 9, wherein the integrity failure detector comprises:
an accumulator to compute a vector sum of the zero-mean error vector and a previous sum;
expected value computing logic to compute a magnitude of the vector sum; and
a comparator to compare the magnitude to a threshold.

11. An apparatus as defined in claim 9, further comprising an initial position estimator to estimate a starting position estimate based upon at least two previous position fixes estimated by the position fix engine.

12. An apparatus as defined in claim 9, wherein at least one of the position fix engine, the zero-mean computing logic or the integrity failure detector are implemented by a processor executing machine accessible instructions.

13. An article of manufacture storing machine accessible instructions which, when executed, cause a machine to:
measure a plurality of pseudoranges using an antenna;
estimate a position fix from the plurality of measured pseudoranges;
compute a first measurement error vector based on the position fix and the plurality of measured pseudoranges;
compute a mean of the first measurement error vector;
subtract the mean from the first measurement error vector to form a first zero-mean error vector; and
determine whether an integrity failure has occurred based on the first zero-mean error vector.

14. An article of manufacture as defined in claim 13, wherein the machine accessible instructions, when executed, cause the machine to:
update the position fix based on the plurality of measured pseudoranges and a state vector to form a second measurement error vector;
compute a second zero-mean error vector based upon the second measurement error vector; and
compute a vector sum of the first and the second zero-mean error vectors, wherein determining if an integrity failure has occurred is based on the sum.

15. An article of manufacture as defined in claim 14, wherein the machine accessible instructions, when executed, cause the machine to:
compute a magnitude of the vector sum; and
compare the magnitude to a threshold to determine whether the integrity failure has occurred.

16. An article of manufacture as defined in claim 13, wherein the machine accessible instructions, when executed, cause the machine to:
determine a starting position estimate based upon the position fix;
measure a second plurality of pseudoranges using the antenna; and
estimate a second position fix from the second plurality of measured pseudoranges and the starting position estimate.

17. An article of manufacture as defined in claim 13, wherein the machine accessible instructions, when executed, cause the machine to measure the pseudoranges using the antenna by:
receiving a plurality of times from respective ones of a plurality of satellites via the antenna; and
calculating the pseudoranges from the plurality of received times based upon orbital locations of the plurality of satellites.

* * * * *